United States Patent [19]
Morihira

[11] Patent Number: 6,093,105
[45] Date of Patent: Jul. 25, 2000

[54] FIGHTING-TYPE TELEVISION GAME MACHINE AND A STORAGE MEDIUM FOR STORING A PROGRAM OF SUCH A GAME

[75] Inventor: Shigeki Morihira, Amagasaki, Japan

[73] Assignee: Konami Co., Ltd., Hyogo-ken, Japan

[21] Appl. No.: 08/909,220

[22] Filed: Aug. 11, 1997

[30] Foreign Application Priority Data

Aug. 22, 1996 [JP] Japan .................................. 8-221601

[51] Int. Cl.[7] .................................................. A63F 13/00
[52] U.S. Cl. ................................ 463/38; 463/30; 463/31; 273/440.1
[58] Field of Search ............................... 463/1–8, 30, 31, 463/43–45; 273/440.1, 441, 454, 461, DIG. 28, 856, 433, 434, 435, 436, 437, 438, 439

[56] References Cited

U.S. PATENT DOCUMENTS

| | | | |
|---|---|---|---|
| 4,491,324 | 1/1985 | Yoshida | 463/8 |
| 5,390,937 | 2/1995 | Sakaguchi et al. | 463/2 |
| 5,704,837 | 1/1998 | Iwasaki et al. | |
| 5,769,718 | 6/1998 | Rieder | 463/31 |

FOREIGN PATENT DOCUMENTS 634727 1/1995 European Pat. Off. .
7-155462 6/1995 Japan .

OTHER PUBLICATIONS

Patent Abstracts of Japan, vol. 095, No. 009, Oct. 31, 1995 & JP 07 155463 A (Hudson Soft Co Ltd), Jun. 20, 1995.

*Primary Examiner*—Valencia Martin-Wallace
*Assistant Examiner*—John Hotaling, II
*Attorney, Agent, or Firm*—Jordan and Hamburg LLP

[57] ABSTRACT

To enable an easy grasp of a positional relationship of the respective characters within a fighting field.

A specified fighting field and two character images are displayed on a monitor 7 by a control of a controller 8 based on an image data stored on a storage 6, and the motions of the respective character images are operated by operation keys of first and second operation units 1, 2. Further, a window display unit 11 reads the image data of the image being displayed from the controller 8, forms a window screen smaller in size than the screen of the monitor 7 in a position within the monitor 7 where the window screen does not hinder the motions of the two character images, and gives a display command to the controller 8 so as to display the fighting field centering around the two characters, and symbols P1, P2 representing the two characters.

10 Claims, 3 Drawing Sheets

FIGHTING-TYPE TELEVISION GAME MACHINE AND A STORAGE MEDIUM FOR STORING A PROGRAM OF SUCH A GAME

The present invention relates to a fighting-type television game machine for contending for victory by fighting of two characters within a specified fighting field and a storage medium for storing a program of such a game.

BACKGROUND OF THE INVENTION AND RELATED ART STATEMENT

Normally, in a fighting-type television game machine for two players, a necessary one of image data stored in a storage is read by a display controller; a fighting field defined by a partition such as a wall (could be a boundary drawn on the fighting floor) and two character images are displayed on a monitor based on the read image data; and the motions of both character images on display are operated by the two players by means of operation keys provided in the respective operation units so as to give tricks (attacks) to each other and contend for victory within a specified game time.

In the conventional game machine, images of the two characters caught by a virtual camera which moves according to the motions of the two characters are displayed on the monitor. Depending upon the position of the virtual camera, it is difficult to grasp a distance to the front or rear partition (a wall or just the boundary) when the character images move forward or backward of the screen. Further, it is difficult for the respective players to grasp in which direction their characters are facing, i.e. whether their characters are facing to the right or left. In such cases, the players cannot give a suitable trick (attack) to the opponent characters.

In view of the above problem, an object of the present invention is to provide a fighting-type television game machine in which a positional relationship of two characters within a fighting field can be easily grasped and a storage medium for storing a program of such a game.

SUMMARY OF THE INVENTION

The invention is directed to a fighting-type television game machine. The fighting-type television game machine comprises a monitor screen; a storage unit for storing specified image data; a display controller for displaying the images of characters on the monitor screen based on the specified image data; operation units for outputting the signals corresponding to respective motions of each character displayed on the monitor screen in such a manner to contend for victory by the fighting within a specified fighting field; and a window display unit for reading the image data from the display controller to form a window screen smaller than the monitor screen within the monitor screen to display a plan image of the fighting field of the vicinity of the respective characters and symbols representing the respective characters on the window screen.

The invention is also directed to a storage medium for storing a program of a fighting-type television game in which the motions of images of a plurality of characters displayed on a monitor screen are controlled in accordance with operation signals from corresponding operation units and the respective characters fight within a specified fighting field to contend for victory, wherein an image data of the image being displayed is read, a window screen smaller than the monitor screen is formed within the monitor screen, and the fighting field centering around the respective characters, a plan image of the partition and symbols representing the respective characters are displayed on the window screen.

With the above game machine and storage medium, the window screen displaying the fighting field centering around the respective characters, the plane image of the specified fighting field and the symbols representing the respective characters is formed within the monitor screen.

Accordingly, the positional relationship of the fighting field and the two characters when viewed from above can be grasped from the window screen. Thus, the players can easily grasp the situations of their characters.

These and other objects, features and advantages of the present invention will become more apparent upon a reading of the following detailed description and accompanying drawings.

DETAILED DESCRIPTION OF THE PREFERRED EMBODIMENTS OF THE INVENTION

One embodiment of the invention is described with reference to FIGS. 1 to 4.

Figure 1:
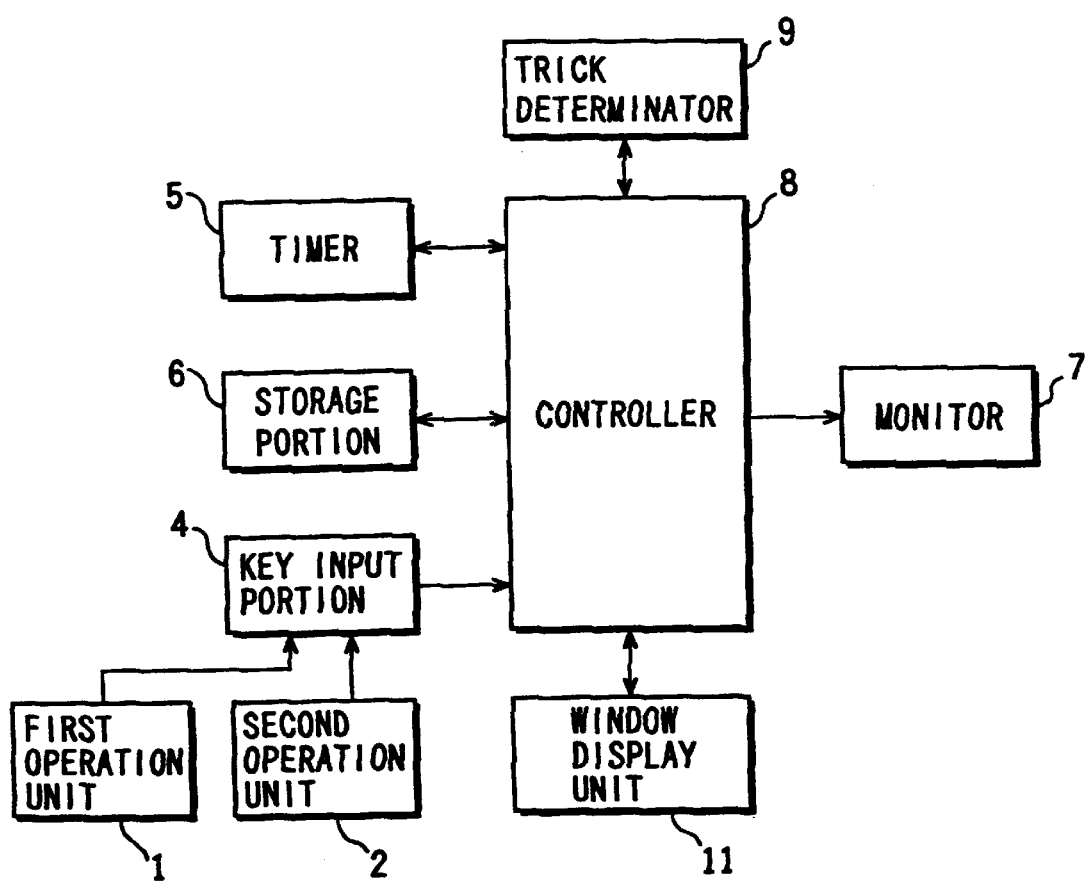
FIG. 1 is a block diagram of one embodiment of the invention.

In FIG. 1 showing an entire schematic construction, identified by 1 and 2 are first and second operation units. The operation units 1, 2 are provided with a plurality of operation keys for instructing a variety of motions such as movements and tricks to character images displayed on a monitor screen as described later. One of the operation units 1, 2 is provided with a start key, a selection key and other keys.

Identified by 4 is a key input portion which receives operation signals outputted in response to the operation of the respective keys of the operation units 1, 2. The key input portion 4 gives a command corresponding to the inputted operation signal to a controller to be described later. Identified by 5 is a timer which starts operating in accordance with a count control signal from the controller when the start key is operated to count one round of the game. Identified by 6 is a storage comprised of a semiconductor memory or the like for storing specified image data.

Figure 2:
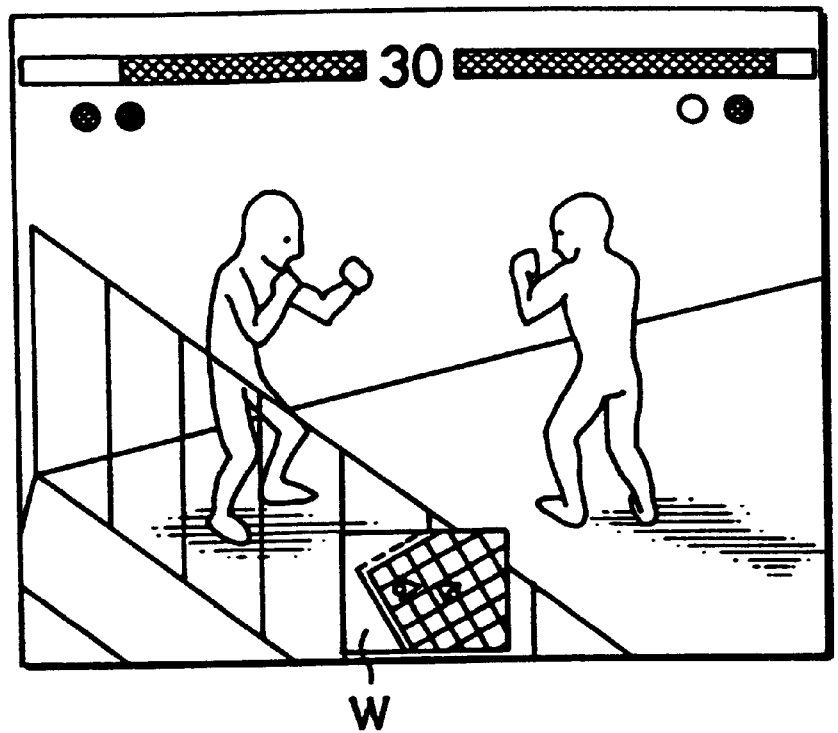
FIG. 2 is a diagram showing a monitor screen.

Identified by 7 is a color display monitor comprised of, e.g. a liquid crystal display or a CRT. Identified by 8 is a controller which reads necessary image data concerning the fighting field defined by a wall or like partition and two characters which are selected by the operation of the operation units to be opponents, and has a function as a display controller of displaying the fighting field and images of the two characters on the screen of the monitor 7, for example, as shown in FIG. 2, a function of moving the two character images displayed on the screen of the monitor 7 in response to the operation of the operation keys of the operation units 1, 2 and a function of controlling the entire system. Identified by 9 is a trick determinator which determines, based on the motions of the two character images, tricks designated by the operation of the operation units 1, 2 and whether or not these tricks are winning tricks.

Identified by 11 is a window display unit which reads the image data of the image being displayed from the controller 8; forms a window screen W, which is smaller in size than the screen of the monitor 7, in a position within the screen of the monitor 7 where it does not hinder the motions of the two character images; and gives a display command to the controller 8 so as to display a fighting field F centering around the two characters, a plane image of the partition D defining the fighting field, F, and symbols P1, P2 which are modified plan views of the two characters. In FIG. 2, a number in the middle of an upper part indicates a remaining time of the game, and bars on the right and left sides of this number are gauges indicating a remaining power of the two characters. o below the gauges indicates gained points of each character as a result of the determination of the trick determinator 9.

The window display unit 11 gives a command to the controller 8 so that the controller 8 replaces a part of a video signal component corresponding to a plurality of horizontal scanning line numbers included in one specific period of each vertical scanning period of a television signal which is a display signal outputted from the controller 8 to the monitor 7 by a video signal component constituting the aforementioned window screen W at a predetermined timing.

Figure 3:
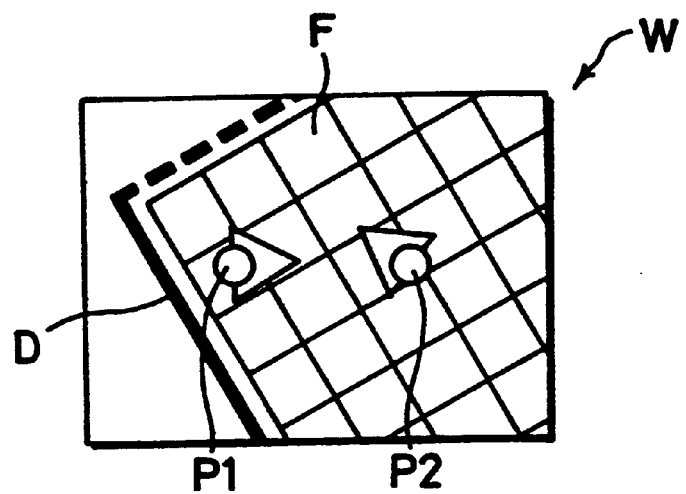
FIG. 3 is a diagram showing a window screen within the monitor screen.

In an enlarged view of the window screen W of FIG. 3, the aforementioned symbols P1, P2 are chosen to have a triangular shape so that in which direction the characters are facing can be seen. The window display unit 11 has a zoom display function of constantly displaying the symbols P1, P2 side by side within the window screen W while keeping a distance between the symbols P1, P2 within the window screen W constant independently of a distance between the two image characters. Specifically, the controller 8 has a function of constantly monitoring the distance between the symbols P1, P2 within the fighting field, and the window display unit 11 successively receives a distance data from the controller 8 and forms an image which adjusts an enlargement/reduction ratio (zooming ratio) of the window screen W so as to be inversely proportional to the distance data (i.e. adjustably change the size of the square measures).

Since the partition is made of a wall as described above, a control program of the controller 8 is set such that the durability of the partition D decreases in steps due to an impact caused when the characters strike against the partition D and the partition D is broken when there is no more durability. The window display unit 11 has a function of displaying the partition D within the window screen W according to a varying durability of the partition D. Durability may be calculated by accumulating the number of contact of the symbols with the partition D and the moving speed (impact) of the symbol at the time of contact which is converted into a numerical value, and may be displayed so as to correspond to the obtained numerical value.

On the window screen W, for example, the fighting field F is displayed in green, the symbols P1, P2 of the characters are displayed in red and blue, respectively, and the partition D is displayed such that display color changes in four stages of green, yellow, orange and red (or gradually changes) as durability decreases. Further, the size of square measures formed in the fighting field on display is enlarged or reduced according to the zooming, so that the zooming, i.e. the distance between the symbols P1, P2 can be easily grasped.

Next, a procedure of displaying images on the window screen W is described with reference to a flow chart of FIG. 4.

First, a partition check processing is performed (Step S1). When the partition D is broken or damaged, the color of the partition D of the fighting field F on the screen of the monitor 7 is changed by the control of the controller 8. The color of the partition D on the monitor 7 is checked during the processing of Step S1, and the display color of the partition D within the window screen W is changed to the color of partition on the monitor 7 by the window display unit 11.

Subsequently, a symbol arrangement determination processing is performed (Step S2). When the two characters are displayed on the screen of the monitor 7 by the controller 8, which symbol should be on the right side is predetermined by a main display program. Accordingly, the left/right arrangement of the symbols P1, P2 is determined in accordance with this main program.

Figure 4:
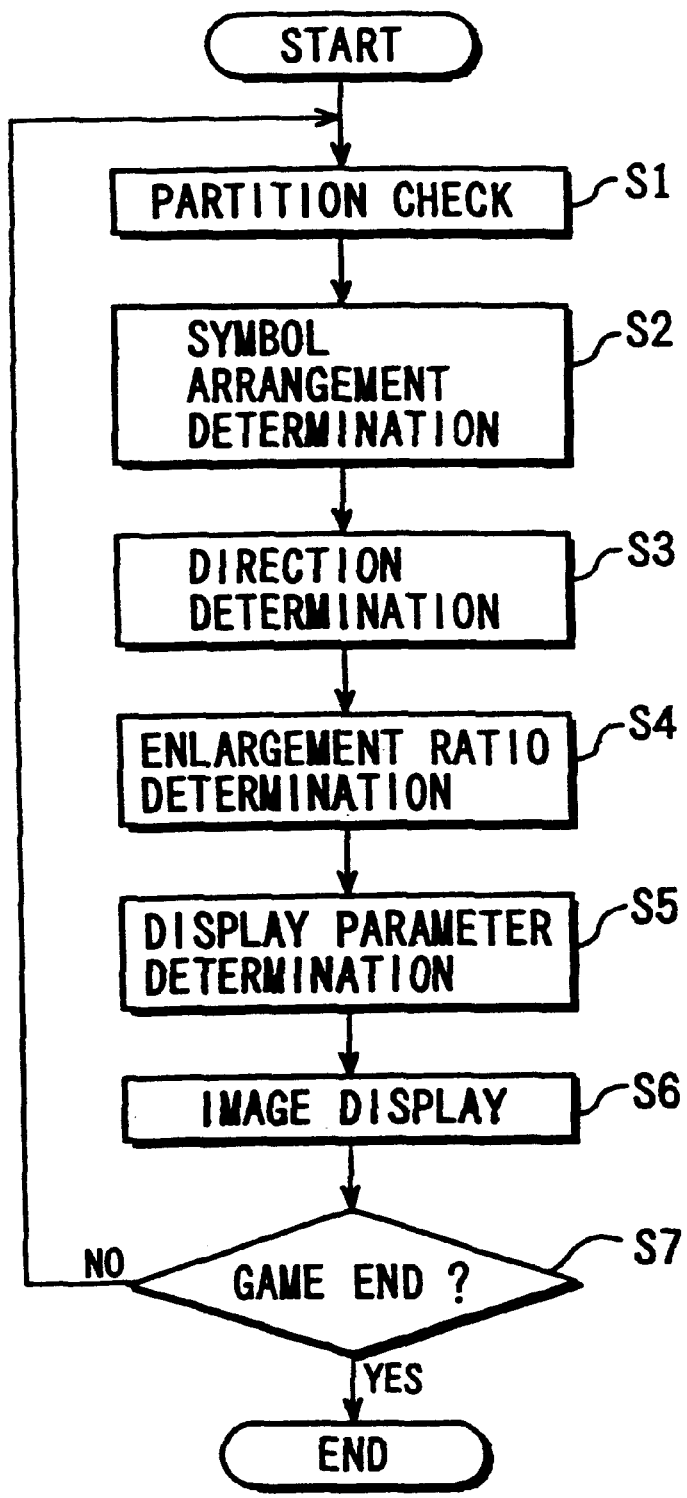
FIG. 4 is a flow chart of a control for a game.

Next, as shown in FIG. 4, a direction determination processing is performed (Step S3). During this processing, an angle of a virtual point of viewing the symbols P1, P2 is adjusted and determined in such a manner that the two characters are constantly located side by side along a transverse direction when the characters are viewed from right above.

An enlargement ratio determination processing is then performed (Step S4). During this processing, the display enlargement ratio of the image within the window screen W is determined such that the distance between the symbols P1, P2 within the window screen W is constant independently of the distance of the character images on the screen of the monitor 7.

Subsequently, a display parameter determination processing is performed (Step S5) to determine parameters necessary to display the symbols P1, P2 in accordance with the display conditions determined by the processings of Steps S1 to s4. An image display processing is then performed (Step S6) to display the field F, the partition D, and the symbols P1, P2 within the window screen W in this order. Subsequently, whether the game has ended is determined (Step S7). This routine returns to Step S1 if this discrimination result is "NO" to repeat the processing of Steps S1 to S6, while the image display operation of the window screen W is completed upon the judgment that the game has ended if the determination result is "YES".

Accordingly, since the positional relationship between the fighting field F, the partition D and the two characters when viewed from above can be grasped from the symbols P1, P2 displayed on the window screen W, both players can easily grasp the situations of their characters.

Further, the symbols P1, P2 are displayed such that in which directions the characters are facing can be seen and the symbols P1, P2 are constantly located side by side at a fixed distance from each other within the window screen W independently of the distance between the two character images on the screen of the monitor 7. Accordingly, each player can more easily grasp the positional relationship between his character and the opponent character and immediately determine whether or not his character is in a situation where his character can properly give a trick to the opponent character. It should be noted that the symbols P1, P2 may be displayed so as to correspond to a distance between the character images. This is particularly effective in the case that there are three or more symbols.

Further, since the display color of the partition D made of a wall within the window screen W is changed according to the degree of durability, each player can easily grasp the state of the partition D near his character, e.g. the presence of the partition and a possibility that the partition D is easily broken when the character strikes against it and the character moves out of the fighting field.

Although the display color of the partition D made of a wall within the window screen W is changed according to the degree of durability thereof in the foregoing embodiment, the degree of durability may be expressed not by changing the color, but by changing the thickness or type of the line.

Although the plane image is displayed on the window screen W in the foregoing embodiment, an image based not on the characters, but on one direction of the fighting field F may be displayed provided that the left/right positional relationship, distance and orientation of the two characters, and the positional relationship between of the characters and the partition are properly distinguishable. Further, a solid (three-dimensional) image may be displayed in an oblique direction.

The partition is not limited to the one made of a wall, but may be made of a net. Furthermore, the partition does not have to be present in the game machine of this invention, but only a boundary indicating the specified fighting field can function as an indicator of the specified fighting field of this invention.

The number of the characters is not limited to two, but the invention is also applicable to a game in which three or more players can simulatively play to fight with corresponding characters. In such a case, one or more characters may be controlled by the game machine.

As described above, according to the invention, the window screen displaying the fighting field centering around the respective characters, the plane image of the partition defining the fighting field and the symbols representing the respective characters is formed within the monitor screen. Accordingly, the positional relationship of the fighting field, the partition and the two characters when viewed from above can be grasped from the window screen. Thus, the players can easily grasp the situations of their characters.

Further, when there are two characters, the two symbols may be preferably displayed on the window screen while keeping a distance between the two symbols within the window screen constant independently of a distance between the images of the two characters. Accordingly, each player can more easily grasp the positional relationship of this character and the opponent's character.

Furthermore, when there are two characters, the two symbols may be constantly displayed side by side along a specified line. Accordingly, each player can more easily grasp the positional relationship of this character and the opponent's character.

Further, since the respective symbols are displayed in such a manner that in which directions the respective characters are facing can be seen, each player can easily make a decision as to whether or not his character is in a situation where it can properly give a trick to the opponent' character.

Furthermore, since the partition made of a wall is displayed according to the degree of its durability, each player can easily grasp the state of the partition D near his character, e.g. the presence of the partition and a possibility that the partition D is easily broken when the character strikes against it and the character moves out of the fighting field.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A fighting-type television game machine comprising:

a monitor screen;

a storage unit for storing specified image data;

a display controller for displaying the images of characters on the monitor screen based on the specified image data;

operation units for outputting the signals corresponding to respective motions of each character displayed on the monitor screen in such a manner to contend for victory by the fighting within a specified fighting field; and a window display unit for reading the image data from the display controller to form a window screen smaller than the monitor screen within the monitor screen to display a plan image of the fighting field of the vicinity of the respective characters and symbols representing the respective characters on the window screen, said window display unit displaying the two symbols corresponding to the two characters in such manner that a distance between the two symbols within the window screen is set constant regardless of a distance between the images of the two characters on the monitor screen when two characters are displayed on the monitor screen.

2. A fighting-type television game machine comprising:

a monitor screen;

a storage unit for storing specified image data;

a display controller for displaying the images of characters on the monitor screen based on the specified image data;

operation units for outputting the signals corresponding to respective motions of each character displayed on the monitor screen in such a manner to contend for victory by the fighting within a specified fighting field; and a window display unit for reading the image data from the display controller to form a window screen smaller than the monitor screen within the monitor screen to display a plan image of the fighting field of the vicinity of the respective characters and symbols representing the respective characters on the window screen, said window display unit displaying the two symbols side by side constantly along a specified line when the two characters are displayed on the monitor screen.

3. A fighting-type television game machine according to any one of claims 1 to 2, wherein the window display unit has a function of displaying the respective symbols in such a manner that in which directions the respective characters are facing can be recognized.

4. A fighting-type television game machine comprising:

a monitor screen;

a storage unit for storing specified image data;

a display controller for displaying the images of characters on the monitor screen based on the specified image data;

operation units for outputting the signals corresponding to respective motions of each character displayed on the monitor screen in such a manner to contend for victory by the fighting within a specified fighting field; and a window display unit for reading the image data from the display controller to form a window screen smaller than the monitor screen within the monitor screen to display a plan image of the fighting field of the vicinity of the respective characters and symbols representing the respective characters on the window screen, said window displaying the respective symbols in such a manner that the directions which the respective characters are facing can be recognized.

5. A fighting-type television game machine comprising:

a monitor screen;

a storage unit for storing specified image data;

a display controller for displaying the images of characters on the monitor screen based on the specified image data;

operation units for outputting the signals corresponding to respective motions of each character displayed on the monitor screen in such a manner to contend for victory by the fighting within a specified fighting field defined by a partition, the durability of said partition decreasing upon an impact; and a window display unit for reading the image data from the display controller to form a window screen smaller than the monitor screen within the monitor screen to display a plan image of the fighting field of the vicinity of the respective characters and symbols representing the respective characters on the window screen, the window display unit displaying the partition so as to correspond to the degree of durability of the partition which varies when the characters strike against the partition during the fight.

6. A storage medium for storing a program of a fighting-type television game in which the motions of images of a plurality of characters displayed on a monitor screen are controlled in accordance with operation signals from corresponding operation units and the respective characters fight within a specified fighting field to contend for victory, wherein an image data of the image being displayed is read, a window screen smaller than the monitor screen is formed within the monitor screen, and a plan image of the fighting field vicinity of the respective characters and symbols representing the respective characters are displayed on the window screen, wherein when two characters are displayed on the monitor screen, the two symbols corresponding to the two characters are displayed on the window screen in such a manner that a distance between the two symbols within the window screen is kept constant regardless of a distance between the images of the two characters.

7. A storage medium for storing a program of a fighting-type television game in which the motions of images of a plurality of characters displayed on a monitor screen are controlled in accordance with operation signals from corresponding operation units and the respective characters fight within a specified fighting field to contend for victory, wherein an image data of the image being displayed is read, a window screen smaller than the monitor screen is formed within the monitor screen, and a plan image of the fighting field vicinity of the respective characters and symbols representing the respective characters are displayed on the window screen, wherein when two characters are displayed on the monitor screen, the two symbols corresponding to the two characters are displayed on the window screen in such a manner that the two symbols are constantly located side by side along a specified line.

8. A storage medium for storing the program of the fighting-type television game according to claim 6 or 7, wherein the durability of the partition decreases upon an impact, and wherein the partition is displayed on the window screen so as to correspond to the degree of durability thereof which varies when the characters strike against the partition during the fight.

9. A storage medium for storing a program of a fighting-type television game in which the motions of images of a plurality of characters displayed on a monitor screen are controlled in accordance with operation signals from corresponding operation units and the respective characters fight within a specified fighting field to contend for victory, wherein an image data of the image being displayed is read, a window screen smaller than the monitor screen is formed within the monitor screen, and a plan image of the fighting field vicinity of the respective characters and symbols representing the respective characters are displayed on the window screen, wherein the respective symbols are displayed on the window screen in such a manner that the directions the respective characters are facing can be recognized.

10. A storage medium for storing a program of a fighting-type television game in which the motions of images of a plurality of characters displayed on a monitor screen are controlled in accordance with operation signals from corresponding operation units and the respective characters fight within a specified fighting field to contend for victory, said fighting field being defined by a partition, the durability of said partition decreasing upon an impact, wherein an image data of the image being displayed is read, a window screen smaller than the monitor screen is formed within the monitor screen, and a plan image of the fighting field vicinity of the respective characters and symbols representing the respective characters are displayed on the window screen, wherein the partition is displayed on the window screen so as to correspond to the degree of durability of the partition which varies when the characters strike against the partition during the fight.

* * * * *